United States Patent [19]

Nakabayashi et al.

[11] Patent Number: 4,495,020

[45] Date of Patent: Jan. 22, 1985

[54] PRIMER FOR BONDING POLYESTER PLASTICS

[75] Inventors: Masamitsu Nakabayashi, Sennan; Masuo Miyaji, Izumi; Yoshio Kamatani, Osaka, all of Japan

[73] Assignee: Takeda Chemical Industries, Ltd., Osaka, Japan

[21] Appl. No.: 466,555

[22] Filed: Feb. 15, 1983

[30] Foreign Application Priority Data

Feb. 18, 1982 [JP] Japan ................................ 57-25482

[51] Int. Cl.$^3$ ................................................ C09J 5/04
[52] U.S. Cl. .............................. 156/314; 106/287.21; 106/287.25; 156/326; 156/334; 427/412.5; 428/482; 544/67
[58] Field of Search ........................ 156/314, 334, 326; 427/412.5; 106/287.21, 287.25; 428/482; 544/67

[56] References Cited

U.S. PATENT DOCUMENTS

| | | | |
|---|---|---|---|
| 3,703,426 | 11/1972 | Larson et al. | 156/314 |
| 3,748,329 | 7/1973 | Liebsch et al. | 544/67 |
| 4,295,910 | 10/1981 | Cooley et al. | 156/314 |

FOREIGN PATENT DOCUMENTS 0043651  1/1982  European Pat. Off. .............. 544/67

*Primary Examiner*—John J. Gallagher
*Attorney, Agent, or Firm*—Wenderoth, Lind & Ponack

[57] ABSTRACT

Disclosed is a primer composition which contains an isocyanate compound having one or more 1,3,5-oxadiazine-2,4,6-trione rings as an adhesion promoter, which is useful as a primer for bonding polyester plastics to the same or different substrates using an adhesive such as polyurethane, epoxy and polyolefin adhesives. When the surface of polyester plastics is treated with said primer prior to application of the adhesive, the bonding achieved is excellent in adhesion.

8 Claims, No Drawings

PRIMER FOR BONDING POLYESTER PLASTICS

The present invention relates to primers for bonding polyester plastics.

More particularly, this invention is concerned with a primer or a primer composition for undercoating the surface of polyester plastics prior to bonding the polyester plastics to the same or different substrates, which primer contains an isocyanate compound having one or more 1,3,5-oxadiazine-2,4,6-trione rings (hereinafter referred to briefly as "oxadiazinetrione ring" or "trione ring") as an adhesion promoter.

For bonding polyester plastics, especially fiber glass reinforced plastics obtained from unsaturated polyester resin compositions (hereinafter referred to briefly as FRP), there have been conventionally adopted a wet lay up method or mat-in joint method, which comprises bonding plastics to plastics with use of the same materials as those of the substrate plastics, and other methods involving use of various adhesives. However, when potent adhesive strength is required, it is essential that the bond surface of the plastics is degreased or cleaned with a solvent, followed by mechanical surface treatment by means of shotblasting or sandblasting. In recent years, various types of primer treatment have been proposed as an alternative to mechanical surface treatment, but the effect is achieved only in combination with particular adhesives and is not necessarily satisfactory in terms of degree of the effect. For example, a primer consisting of an isocyanate component is normally used together with polyurethane adhesives and a primer consisting of an epoxy component is normally used together with epoxy adhesives, but primers suitable for common use with various adhesives have not been developed yet. When more potent adhesive strength is required, there has been adopted a method which comprises providing a roughened surface by means of sanding or blasting treatment and further treating with a primer, followed by bonding of polyester plastics with use of an adhesive suitable for said primer.

In view of these facts, the present inventors conducted extensive investigation, and as a result found that a primer which contains an isocyanate compound having an oxadiazinetrione ring, unlike conventional primers for polyester plastics, is unexpectedly adaptable to any kind of adhesives, and can provide the bonding with strong adhesion such that breakage is accompanied with destruction of polyester plastics themselves merely by undercoating with the primer on the surface to be bonded in advance of bonding with an adhesive without any mechanical treatment of the plastic surfaces.

Thus, this invention is a primer composition for undercoating the surface of polyester plastics prior to the bonding of the polyester plastics to the same or different substrates with use of an adhesive, which primer contains an isocyanate compound having one or more 1,3,5-oxadiazine-2,4,6-trione rings.

This invention also provides a method for bonding polyester plastics to the same or different substrates, which comprises undercoating the surface of the polyester plastics with a primer composition which contains an isocyanate compound having one or more 1,3,5-oxadiazine-2,4,6-trione rings and, then, bonding the polyester plastics to the same or different substrates with use of an adhesive.

The isocyanate compound having an oxadiazinetrione ring, which is useful as a primer component according to the present invention, means a compound having both oxadiazinetrione ring and isocyanate group in the molecule and can be produced by the reaction of an isocyanate with carbon dioxide.

The starting isocyanate includes an aliphatic, an alicyclic and an aromatic-aliphatic isocyanate; for example, use is suitably made of polyisocyanates such as tetramethylene diisocyanate, hexamethylene diisocyanate, ω,ω'-diisocyanatodipropyl ether, 2,6-diisocyanatocaproate, 1,6,11-triisocyanatoundecane, bis(isocyanatomethyl)- cyclohexane, bis(isocyanatoethyl)cyclohexane, 1-isocyanate-3-isocyanatomethyl-3,5,5-trimethylcyclohexane, bis(4-isocyanatocyclohexyl)methane, xylylene diisocyanate and bis(2-isocyanatoethyl)benzene. Their dimer or timer is also usable. These polyisocyanates may be used alone or as a mixture thereof, or can be employed as mixtures with monoisocyanates such as methyl isocyanate, ethyl isocyanate, n-butyl isocyanate, ω-chlorohexyl isocyanate, cyclohexyl isocyanate, cyclohexylmethyl isocyanate, benzyl isocyanate and phenylethyl isocyanate.

The reaction of the isocyanate with carbon dioxide is conducted in the presence of a catalyst such as tertiary phosphines, arsenic compounds and hydroquinones, tertiary phosphines being particularly effective. The reaction is normally conducted by blowing carbon dioxide gas into the reaction system consisting of the isocyanate and the catalyst. The reaction temperature is normally −70° to 150° C., preferably −20° to 70° C. Such reaction normally produces a mixture of isocyanate compounds having one to several (normally 2 to 5) oxadiazinetrione rings. The reaction goes to conclusion within about 30 minutes to 10 hours, though it depends upon the amount of the catalyst. After the conclusion of the reaction, the unreacted carbon dioxide is removed by blowing nitrogen gas under heating, and the unreacted isocyanate can be removed by conventional methods such as distillation and extraction. After the reaction, it is preferred to add various kinds of compounds in order to stop the reaction completely and to preserve the product stably and as the reaction terminating agent and stabilizer, use can be made of alkylating agents, acylating agents, acids, ester derivatives, phenols, peroxides, sulfur, polysulfides, metal sulfides, halogens, etc.

The isocyanate compound having an oxadiazinetrione ring normally is a mixture of isocyanate compounds having one to 5 trione rings, preferably 1 to 3, and this mixture can be used as a primer component according to the present invention. Also, said primer component may be a mixture which contains unreacted isocyanate monomers. The preferred primer component of the present invention may be a mixture of the following general formula:

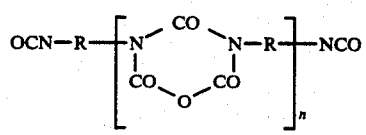

wherein R is a residue of diisocyanate and an average of n is 0.01 to 5, preferably 0.1 to 3.

In addition, adducts having terminal NCO groups which are obtained by reacting said polyisocyanates with a polyol compound (e.g., ethylene glycol, propylene glycol, 1,4-butanediol, glycerine, trimethylolpropane, polyether polyols, polyester polyols, acrylic polyols, epoxy polyols, polyhydroxy polyolefin etc.) or a polyamine (e.g., ethylenediamine, hexamethylenediamine, phenylene diamine, polyether polyamines, polyamidepolyamines, etc.) in the presence of excess NCO groups, can be employed as the polyisocyanate in the production of an isocyanate compound having an oxadiazinetrione ring.

The isocyanate compound having an oxadiazinetrione ring may be a modified product thereof, i.e. its adduct with a polyol as mentioned above.

Among the above-described isocyanate compounds having oxadiazinetrione rings according to the present invention, those derived from hexamethylene diisocyanate, 1-isocyanate-3-isocyanatomethyl-3,5,5-trimethyl-cyclohexane or bis(isocyanatomethyl)cyclohexane exhibit a lower viscosity and an improved coating processability toward polyester plastics substrates, and are especially excellent one falling within the scope of the primer according to the present invention.

A preferable embodiment of the primer of this invention is a primer in the form of a solution, in which said isocyanate compound having an oxadiazinetrione ring is dissolved in an organic solvent inert to the isocyanate. As the organic solvent, use is made of a ketone such as acetone and methyl ethyl ketone, an aromatic hydrocarbon such as toluene and xylene, a halogenated saturated or unsaturated hydrocarbon such as methylene chloride, trichloromethane, trichloroethane and trichloroethylene, a fatty acid ester such as ethyl acetate and butyl acetate, and others. Among these solvents, the use of methylene chloride or methyl ethyl ketone, which also serves the purpose of cleaning surfaces of FRP, is particularly suitable. The concentration of the above-mentioned isocyanate compound having trione ring in the solution is preferably about 0.1 to 50 weight %.

The primer of the present invention may furthermore contain viscosity regulating agents, fillers, dispersion stabilizers, etc., if necessary.

The adhesive, which can be used in combination with the primer of the present invention, may be any type of adhesive that has been conventionally employed, such as those for polyester plastics, especially FRP, and include, for example, a thermosetting resin adhesive and a thermoplastic resin adhesive, etc. Representative examples of the thermosetting resin adhesive include those based on phenol resins, resorcinol resins, epoxy resins, urea resins, melamine resins, polyester, silicone resins, polyurethanes, polyaromatics, etc. Representative examples of the thermoplastic resin adhesives include those based on vinylic resins, acrylic resins, cellulose, polyolefins, saturated polyesters, polyamides, etc.

Among these adhesives, the primer of the present invention is especially valuable in combination with polyurethane, epoxy and polyolefin adhesives.

Particularly, the primer of the present invention is remarkably effective when used in combination with polyolefin based hot-melt type adhesives. As the hot-melt type adhesive, there may be mentioned those based on ethylene/vinyl acetate copolymer (vinyl acetate content 5 to 50 weight %), its saponified product (saponification degree 5 to 95%) and their carboxyl-modified product. These adhesives are known in the art (e.g. Takemelt ® series products manufactured by Takeda Chemical Ind., Ltd.). When a hot-melt adhesive is used, the bonding can be completed by high frequency dielectric heating.

The polyester plastics to which the primer of the present invention is applied are cured products obtained from so-called unsaturated polyester resin composition or compounds such as sheet molding compounds (SMC) and bulk molding compounds (BMC). The cured products are put in wide use as a variety of molded articles. Particularly, FRP products are widely used on a large scale as tanks, sanitary tanks, automobile bodies, etc. The primer of the present invention can offer wide application to the fabrication of these articles by a lamination or hand laid up method, to bonding of molded articles or to bonding of molded articles to different kinds of substrates such as metals (e.g. iron and aluminum), concrete and wood.

In bonding polyester plastics, particularly FRP, with use of the primer of the present invention, the primer is undercoated on the surface of FRP to be bonded, and dried normally at room temperature. The primer of the present invention, though left on standing for some time after the drying, does not lose its effect as a primer. In this sense, the present primer offers one advantage as compared with conventional isocyanate based primers. The amount of the isocyanate compound having a trione ring to be applied to the bonding area is normally in the range of 0.5 g/m$^2$ to 100 g/m$^2$.

For an undercoating procedure, commonly used coating methods such as immersion, spraying and brush-application can optionally be adopted. An adhesive is applied on the primer-coating layer formed by the above-mentioned procedure, and FRP as also treated with the primer or different kind of substrate is laid thereon to achieve the bonding. When the surface of polyester plastics is treated with said primer prior to application of an adhesive, the bonding achieved is excellent in adhesion.

The primer composition of the present invention, when used as a primer in coating with a paint or sealant to FRP, can produce a coating film showing excellent adhesion and being free from peeling.

The examples and reference examples described below will illustrate more specifically the present invention, but do not limit the present invention.

REFERENCE EXAMPLE 1

To 841 g of hexamethylene diisocyanate was added 1.8 g of tri-n-butylphosphine, while carbon dioxide gas was blown into the mixture at 40° C., and the reaction was conducted under stirring for 6 hours. After the supply of carbon dioxide gas was stopped, 0.3 g of powdered sulfur was added, and stirring was continued for 30 minutes, followed by cooling. From the reaction mixture was removed unreacted materials by use of a thin-layer evaporation apparatus, and there was obtained 255 g of a yellowish, slightly viscous liquid. The liquid shows 4.78 meq/g of NCO content, 2.77 meq/g of oxadiazinetrione content and 0.4% of remaining monomer content.

REFERENCE EXAMPLE 2

To 971 g of 1,3-bis(isocyanatomethyl)cyclohexane was added 3.0 g of tri-n-butylphosphine, while carbon dioxide gas was blown into the mixture at 10° C., and the reaction was continued under stirring for 5 hours. The supply of carbon dioxide gas was stopped. Instead, nitrogen gas was supplied, then 3.8 g of benzoyl peroxide was added to the reaction mixture, followed by stirring for 80 minutes. The reaction product was subjected to evaporation removal of unreated materials by use of a thin-layer evaporation apparatus, and there was obtained 280 g of a yellowish, viscous liquid. The liquid shows 4.35 meq/g of NCO content, 2.22 meq/g of oxaziadinetrione content and 0.8% of remaining monomer content.

REFERENCE EXAMPLE 3

Using 194 g of 1,3-bis(isocyanatomethyl)cyclohexane and 2.0 g of tri-n-butylphosphine, the reaction was continued for 8 hours in the same manner as in Reference Example 2. The reaction was terminated with 2.6 g of benzoyl peroxide. The reaction product was dissolved in 100 ml of toluene, and 500 ml of n-hexane was added to the solution. The solution was shaken thoroughly and the solvent layer was removed. After this extraction procedure was repeated three times, butyl acetate was added to the extraction residue to produce a solution with 85% of non-volatile content. The solution shows 2.60 meq/g of NCO content and 2.27 meq/g of oxadiazinetrione content.

REFERENCE EXAMPLE 4

To 194 g of 1,3-bis(isocyanatomethyl) cyclohexane was added 0.04 g of a 40% methanol solution of trimethylbenzylammonium hydroxide dissolved in 4 g of butyl acetate, and the reaction is continued under stirring for 3 hours at room temperature. 0.2 g of benzoyl chloride is added to the reaction mixture in order to terminate the reaction. The fact that the reaction product shows decreased NCO content as low as 39.0% (43.2% before the reaction) and that its infrared absorption spectrum exhibits absorbance at 1690 $cm^{-1}$ demonstrate the formation of isocyanurate ring. 1.4 g of tri-n-butylphosphine was added to the product, while carbon dioxide gas was blown into the mixture at 20° C., and the reaction was continued under stirring for 4 hours. The supply of carbon dioxide gas was stopped. Instead, nitrogen gas was supplied, then 1.2 g of dimethyl sulfate was added to the reaction mixture in order to terminate the reaction. The reaction product shows 25.9% of NCO content. Its infrared absorption spectrum and NMR spectrum indicate that there is otained a product having both oxadiazinetrione and isocyanurate rings.

REFERENCE EXAMPLE 5

194 g of 1,3-bis(isocyanatomethyl)cyclohexane was reacted with 11.8 g of 1,6-hexanediol under stirring at 80° C. for 3 hours. After the reaction mixture was cooled to 30° C., 0.8 g of triethylphosphine was added to the mixture, while carbon dioxide gas was introduced into the mixture, and the reaction is continued for 6 hours. The supply of carbon dioxide gas was stopped, then 0.6 g ethyl bromoacetate was added to the reaction mixture in order to terminate the reaction. The resultant product shows 21.7% of NCO content. The infrared absorption spectrum and NMR spectrum of the product indicate that there is obtained a reaction product having the urethane linkage and oxadiazinetrione ring.

REFERENCE EXAMPLE 6

To a mixture of 22 g of an isocyanate compound having an oxadiazinetrione ring as obtained in Reference Example 1 and 35 g of polyhydroxy polyolefin (Polytele ® H, manufactured by Mitsubishi Chemical Ind. Ltd.) in 50 ml toluene was added 3 mg of dibutylindilaurate. The reaction was continued under stirring at 70° C. for 3 hours and there was obtained an adduct having a NCO content of 0.76 meq/g. and an oxadiazinetrione content of 0.6 meq/g.

EXAMPLE 1

By dissolving 5 g of the isocyanate compound having the oxadiazinetrione ring as obtained in Reference Example 1 in 95 g of methylene chloride, there was obtained a primer solution.

On the other hand, FRP plate, which was fabricated by laminating 5 plies of chopped strand mat (EWR-55EC) with an isophthalic acid-based polyester resin (Polymal ® 6304, manufactured by Takeda ChemicalInd., Ltd.) by a hand laid up method and cured at room temperature, was cut to prepare a test specimen for measurement of adhesive strength by a cross lap method in accordance with a testing method of ASTM D-1344-57.

The above-mentioned primer solution was brush-applied to the bonding surface of the test specimen and dried at room temperature. By use of a hot-melt applicator, Takemelt ® M-203 (a hot-melt adhesive, manufactured by Takeda Chemical Ind., Ltd.) was spread over the surface coated with the primer to be 100μ in thickness of the adhesive layer, and the test specimen was pressed for bonding by contact pressure to another test specimen undercoated with the above-mentioned primer.

The test piece for adhesion test was subjected to measurement of adhesive strength by a cross lap method in accordance with a testing method of ASTM D-1334-57, and showed an adhesive strength of more than 26 kg/$cm^2$ and there was material breaking of the FRP itself.

EXAMPLE 2

By dissolving 10 g of the isocyanate compound having an oxadiazinetrione ring as obtained in Reference Example 2 in 90 g methylene chloride, there was obtained a primer solution. The same procedures as in Example 1 was carried out except that the obtained primer solution was used.

Measurement of adhesive strength by a cross lap method indicated that the test piece showed an adhesive strength of more than 25 kg/$cm^2$ and there was material breaking of the FRP itself.

EXAMPLE 3/Comparison Examples 1 through 5

By dissolving 5 g of the isocyanate compound having an oxadiazinetrione ring as obtained in Reference Example 1 in 95 g of methylene chloride, there was obtained a primer solution.

By cutting the SMC molding article obtained from Polymal Mat ® 133D (a glass content of 30 wt. %, manufactured by Takeda Chemical Ind., Ltd.), test specimens for measurement of the strength properties in shear by tension loading in accordance with a testing method of ASTM D-1002-64 was prepared.

The above-mentioned primer was brush-applied on the bonding surface of the test specimen and dried thoroughly at room temperature.

By use of a hot-melt applicator, Takemelt ® M-203 (a hot melt adhesive, manufactured by Takeda Chemical Ind., Ltd.) was spread over the surface undercoated with the primer to be 50 μin thickness of the adhesive layer, and the test specimen was pressed for bonding by contact pressure to another test specimen coated with the above-mentioned primer solution and dried.

The test piece for adhesion test, in measurement of the strength properties in shear by tension loading by a testing method in accordance with ASTM D-1002-64, showed the results as shown in Table 1 and there happened material breaking of the FRP itself.

As the comparison examples, the same procedures as in Example 1 was repeated except that the compounds given in Table 1 were used in place of the above primer solution. In measurement of tensile shear adhesive strength, the test pieces showed the properties as given in Table 1, and there was interfacial peeling of the FRP in the case of comparision examples.

As is clear from the results shown in Table 1, the primer of the present invention produces a distinguishably excellent effect.

The molded SMC sheet obtained from Polymal Mat ® 609 (a glass content of 30%, manufactured by Takeda Chemical Ind., Ltd.) was cut to prepare a test specimen for measurement of adhesive strength by a cross lap method in accordance with a testing method of ASTM D-1344-57.

The above-mentioned primer solution was brush applied on the bonding surface of the test specimen, and dried at room temperature. An epoxy adhesive [an epoxy adhesive produced by admixing 100 parts by weight of Epotohto YD-128 (an epoxy equivalent of 190, manufactured by Tohto Kasei Co.) commercially available as a diglycidyl-ether-of-Bisphenol-A type

TABLE 1

| Primer Component | Example 3 Reference Example 1 | Comparison Example 1 TDI[1] | Comparison Example 2 CMDI[2] | Comparison Example 3 Takenate[3] | Comparison Exmaple 4 KBM-503[4] | Comparison Example 5 non |
|---|---|---|---|---|---|---|
| Tensile shear adhesion strength (kg/cm$^2$) | >66 | 35 | 35 | 36 | 15 | 35 |
| State of the sheet after adhesion test | B | A | A | A | A | A |

Remarks:
A: peeling in interfacial boundary
B: material (FRP) breaking
[1]Takenate ® 80, manufactured by Takeda Chem. Ind., Ltd.
[2]Milionate ® MR100, manufactured by Nihon Polyurethane Ind. Ltd.
[3]one-can type polyurethane resin for moisture cure (solid content 50%), manufactured by Takeda Chem. Ind., Ltd.
[4]methacryloxysilane and γ-methacryloxypropyltrimethoxysilane, manufactured by Shinetsu Chem. Co., Ltd.

EXAMPLE 4

By dissolving 5 g of an isocyanate compound having oxadiazinetrione ring as obtained in Reference Example 1 in 95 g of methylene chloride, there was obtained a primer solution.

The above-mentioned primer solution was undercoated on the surface of the SMC molded sheet, which was obtained from Polymal Mat ® 609 (a glass content of 30%, manufactured by Takeda Chemical Ind., Ltd.) in an amount of 100 g/m$^2$.

After the sheet was left standing for about 15 minutes to dry the primer, a two-can type urethane resin (Takenate ® F-135/Takelac ® PC-5300, produced by Takeda Chemical Ind., Ltd.) was coated on the surface to about 2 mm of thickness.

After the sheet was left on standing for about 7 days at room temperature, it was subjected to measurement of 180° peeling strength of the film, and showed a value of 11.5 kg/cm.

COMPARISON EXAMPLE 6

By dissolving 10 g of Takenate ® M-402 (manufactured by Takeda Chemical Ind., Ltd.) in 90 g of methylene chloride, there was obtained a primer solution.

The same procedure as in Example 4 was repeated except that this solution was used as a primer and the test piece for adhesion test was prepared and subjected to measurement of 180° peeling strength, thus providing a value of 1.1 kg/cm.

EXAMPLE 5

By dissolving 3 g of an isocyanate compound having oxadiazinetrione ring as obtained in Reference Example 2 in 97 g of methyl ethyl ketone, there was obtained a primer solution.

epoxy resin with 100 parts by weight of aluminum silicate and 60 parts by weight of hexahydrophthalic anhydride] was spread over the surface undercoated with the primer to be 100 μin thickness of the adhesive layer. This treated specimen was laid on another test specimen treaded with the above-mentioned primer and dried. Then, the assembly of the sheets was fixed by a jig to prevent slippage and placed in a heating oven and was subjected to curing at 90° C. for 2 hours. This piece, when tested for adhesive strength by a cross lap method in accordance with ASTM D-1344-57, showed an adhesive strength of more than 23 kg/cm$^2$ and there was material breaking of the FRP itself.

EXAMPLE 6

By dissolving 7 g of an isocyanate compound having oxadiazinetrione ring as obtained in Reference Example 4 in 93 g of methylene chloride, there was obtained a primer solution. The same procedures as in Example 1 was carried out except that thus obtained primer was used.

Measurement of adhesive strength by a cross lap method indicated that the FRP test piece had an adhesive strength of more than 24 kg/cm$^2$ and there was material breaking of the FRP itself.

EXAMPLE 7

By dissolving 15 g of an isocyanate compound having oxadiazinetrione ring as obtained in Reference example 5 in 85 g of methyl ethyl ketone, there was obtained a primer solution. The same procedures as in Example 1 was carried out except that thus obtained primer was used.

Measurement of adhesive strength by a cross lap method indicated that the FRP test piece had an adhesive strength of more than 23 kg/cm² and there was material breaking of the FRP itself.

EXAMPLE 8

FRP panel was fabricated by laminating 5 plies of roving glass cloths with isophthalic acid based unsaturated polyester resin (Polymal® 6304, manufactured by Takeda Chemical Ind., Ltd.), by a hand laid up method and curing the laminated panel at room temperature. By cutting the panel a specimen was prepared for measurement of an adhesive strength by a cross lap method in accordance with a testing method of ASTM D-1344-57. The adhesive surface of the specimen was undercoated with a primer solution as employed in Example 1 using a brush and was dried at room temperature. On the primer-coated surface of the specimen was placed a film (100 thick) of Takemelt® M-203 (hot-melt adhesive, manufactured) by Takeda Chemical Ind., Ltd.), and another specimen, whose adhesive surface was also coated with the above primer solution and dried, was laid thereon. The specimens to be bonded were placed between two electrodes of a high-frequency oscillator (Seidensha Electronic Industries, maximum out put 3KW, frequency 40.6 MHz) and clamped under the pressure of about 2 Kg/cm². Then high-frequency dielectric heating was conducted at anode current of 0.45 Amp. For one minute for bonding the two specimens together.

After bonding, the bonded specimen was slowly cooled under the same pressure as the initial pressure for two minutes.

The bonded specimen showed an adhesive strength of more than 16 Kg/cm² by a cross lap method in accordance with ASTM D-1344-57, and there was material breaking of FRP itself.

What is claimed is:

1. A method for bonding polyester plastics to the same or different substrates which comprises undercoating the surface of the polyester plastics with a primer composition which contains an isocyanate compound having one or more 1,3,5-oxadiazine-2,4,6-trione rings and, then, bonding the polyester plastics to the same or different substrates with use of an adhesive.

2. A method according to claim 1, wherein the adhesive is selected from a thermosetting resin adhesive and a thermoplastic resin adhesive.

3. A method according to claim 2, wherein the thermoplastic resin adhesive is polyolefin based hot-melt type adhesive.

4. The method according to claim 1, wherein the isocyanate compound is one obtained by reacting an aliphatic, an alicyclic or an aromatic-aliphatic isocyanate with carbon dioxide.

5. The method according to claim 4, wherein the isocyanate is hexamethylene diisocyanate, 1-isocyanate-3-isocyanatomethyl-3,5,5-trimethylcyclohexane or bis-(isocyanatomethyl)cyclohexane.

6. The method according to claim 1, wherein the primer composition is a solution in which the isocyanate compound is dissolved in an organic solvent.

7. The method according to claim 6, wherein the concentration of the isocyanate compound in the solution is about 0.1 to 50 weight %.

8. The method according to claim 6, wherein the solvent is a ketone, an aromatic hydrocarbon, a halogenated saturated or unsaturated hydrocarbon or a fatty acid ester.

* * * * *